United States Patent [19]
Tsujino

[11] Patent Number: 5,904,245
[45] Date of Patent: May 18, 1999

[54] STORAGE ARRANGEMENT FOR RECORDING MEDIA USING DETACHABLE MOUNTING COMPONENTS

[75] Inventor: Nobuaki Tsujino, Ikoma, Japan

[73] Assignee: Kokuyo Co., Ltd., Osaka, Japan

[21] Appl. No.: 08/860,667

[22] PCT Filed: Feb. 19, 1996

[86] PCT No.: PCT/JP96/00358

§ 371 Date: Jul. 7, 1997

§ 102(e) Date: Jul. 7, 1997

[87] PCT Pub. No.: WO97/17273

PCT Pub. Date: May 15, 1997

[30] Foreign Application Priority Data

Nov. 8, 1995 [JP] Japan ............................... 7-289905

[51] Int. Cl.[6] .................................................. B65D 85/57
[52] U.S. Cl. .................... 206/308.1; 206/232; 206/311
[58] Field of Search ............................ 206/308.1, 308.3,
206/309, 311, 312, 313, 232; 402/75, 502

[56] References Cited

U.S. PATENT DOCUMENTS

| | | | |
|---|---|---|---|
| 4,823,950 | 4/1989 | Roze | 206/311 |
| 4,860,897 | 8/1989 | Fowler et al. | 206/308.3 X |
| 4,892,189 | 1/1990 | Kunimune et al. | 206/232 |
| 5,176,250 | 1/1993 | Cheng | 206/308.1 X |
| 5,188,228 | 2/1993 | Barrett | 206/308.1 |
| 5,413,215 | 5/1995 | Harding, Jr. | 206/308.1 |
| 5,477,960 | 12/1995 | Chen | 206/308.1 |

FOREIGN PATENT DOCUMENTS

| | | |
|---|---|---|
| 50-159705 | 12/1975 | Japan. |
| 63-77782 | 5/1988 | Japan. |
| 1-59676 | 4/1989 | Japan. |
| 3-64281 | 6/1991 | Japan. |
| 4-5369 | 1/1992 | Japan. |
| 5-139480 | 6/1993 | Japan. |
| 5-32467 | 8/1993 | Japan. |
| 6-321279 | 11/1994 | Japan. |
| 8-26368 | 1/1996 | Japan. |
| WO 9009332 | 8/1990 | WIPO. |
| WO 9602441 | 2/1996 | WIPO. |

*Primary Examiner*—Bryon P. Gehman
*Attorney, Agent, or Firm*—Lowe Hauptman Gopstein Gilman & Berner

[57] ABSTRACT

Holder members (11, 12) having a plurality of accommodation pockets (20) and an extension holder member (13) which can be connected between the holder members (11, 12) form a holder (10). An insertion portion (22) is formed in an end portion of each of the holder members (11, 12). On the other hand, a back-plate member (45) having an insertion portion (53) is attached to an end portion of the connection portion of the extension holder member (13). A connection member (14) having a pair of connection sections (30) for connecting the holder members (11 to 13) to one another has a structure such that the connection sections (30) are inserted into the insertion portions (22, 53).

6 Claims, 9 Drawing Sheets

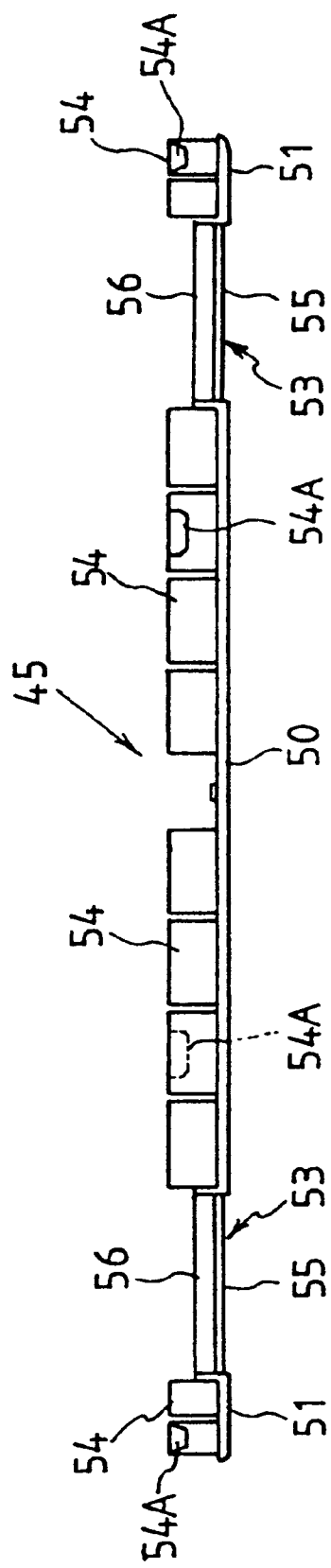
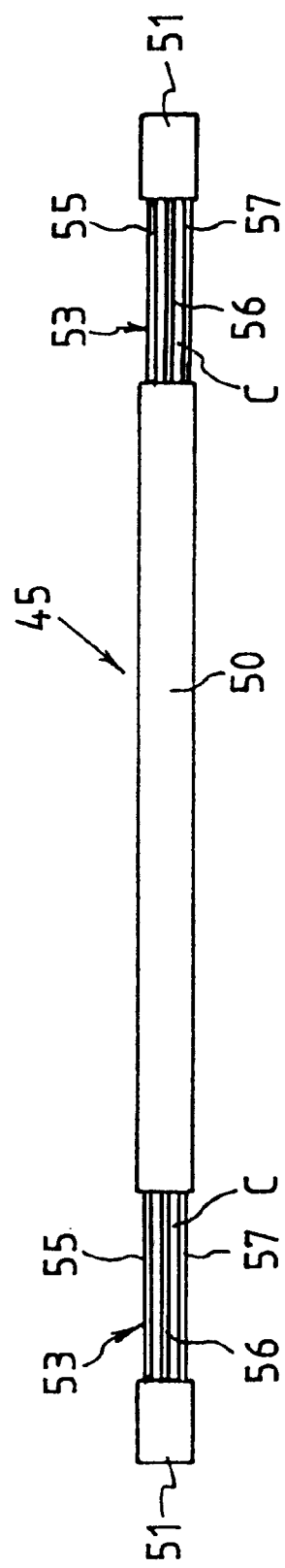
FIG. 9 (A)
FIG. 9 (B)

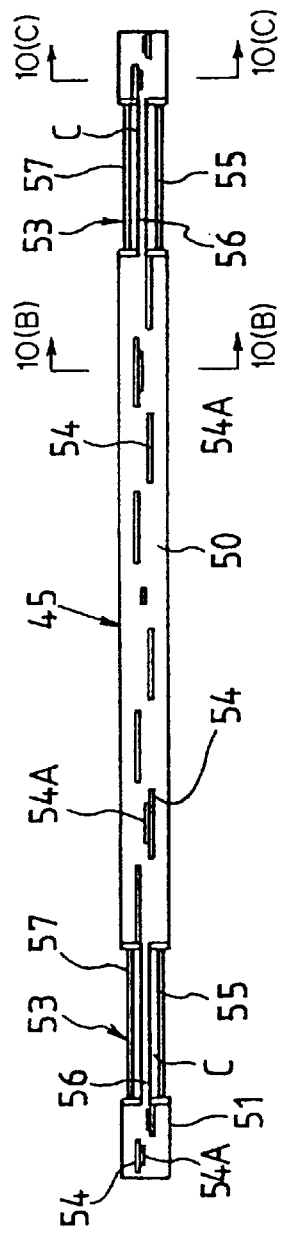
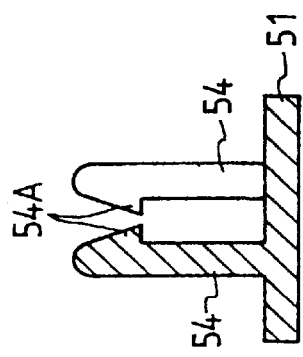
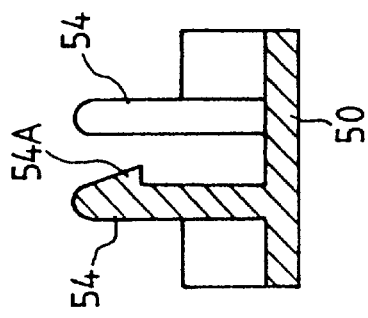

STORAGE ARRANGEMENT FOR
RECORDING MEDIA USING DETACHABLE
MOUNTING COMPONENTS

TECHNICAL FIELD

The present invention relates to a holder, and more particularly to a holder which is capable of arbitrarily increasing or decreasing the quantity of various recording mediums, for example, floppy disks, compact disks, cassette tapes or video tapes, to be accommodated and which permits different states of accommodation to be selected.

BACKGROUND ART

Recording media, such as floppy disks, as a result of current and rapid development, have necessitated a need for, a variety of files, holders and the like suitable to accommodate and store the foregoing recording media. For example, a file as disclosed in Japanese Utility Model Publication No. 5-32467, includes pockets arranged to accommodate floppy disks and is formed by dividing opposite inner surfaces of an inside cover and a back cover into a plurality of sections.

However, the maximum number of floppy disks which can be accommodated in the above file is limited to the number of the pockets formed on the inner surfaces of the inside cover and the back cover. If floppy disks are intended to be accommodated by a number lager than the number of the pockets, another file must be used. Therefore, if the quantity of floppy disks to be stored is large, a plurality of files must be used. Thus, there arises a problem in that a single file cannot integrally store a large quantity of floppy disks.

On the other hand, in Japanese Patent Publication No. 4-5369 or Japanese Patent Laid-Open No. 6-321279, there have been disclosed holders of a type formed into a single body capable of accommodating a plurality of floppy disks. Each of the holders has a structure comprising binding openings formed at an end portion thereof. Therefore, the openings of the holder can be pierced by binding rings to accommodate an increase in the quantity of accommodated floppy disks.

In the case of the holder disclosed in Japanese Patent Laid-Open No. 6-321279, another structure is employed which comprises hooks at positions opposite to a portion having the binding openings such that the hooks can be received by a rail for a drawing hanger so that different states of accommodation are selectively provided.

However, the holders disclosed in Japanese Patent Publication No. 4-5369 and Japanese Patent Laid-Open No. 6-321279 cannot to bind floppy disks if the quantity is larger than the width of the binder for accommodation. Moreover, since each of the holders of the foregoing type has a thickness at least larger than the thickness of the floppy disk, the number of floppy disks, allowed to be bound, is inevitably limited even if a structure is employed in which the holders can be bound in the binder or the like. Thus, the foregoing method is not a drastic method that is capable of enabling floppy disks, which are gradually increased in number, to be integrally accommodated.

Although the holder disclosed in Japanese Patent Laid-Open No. 6-321279 is able to select a state where the holders are accommodated, the hooks project over the end portions opposite to the portion to be bound Thus, there arises a problem in that the hooks are obstacles when the holder is bound in the binder. Moreover, the quality of the appearance in view of the design has been unsatisfactory.

DISCLOSURE OF THE INVENTION

To overcome the foregoing problems, the present invention enables a plurality of holder members to be arbitrarily connected to one another and separated from one another. The mutual connections of the holder members are performed by attaching a connection member to be positioned across the end portions of the holder members. By detachably providing the connection member and by removing the connection member, extension holder members can successively be bound, followed by attaching the connection member between the end portions. Thus, the number of the extension holders can be increased.

According to the present invention, there is provided a holder comprising a pair of holder members each having accommodation pockets for recording media in such a manner that ends of the holder members can be opened while other ends are made to be support points. The pair of holder members are mutually separably connected to each other through a connection member detachably provided for the ends. The connection member is enabled to be attached across the ends of the holder members. Thus, the holder members can be integrated without use of a binder or the like. In a state where the connection member has been removed, the holder members are separated from each other so that the respective holder member can be used independently.

It is preferable that at least one or more extension holder members are attached between the pair of holder members in such a manner that connection is enabled. Since the structure is arranged such that the pair of holder members can be separated from each other, a multiplicity of extension holders can be connected between the holder members. The mutual connections of the holder members can be performed by attaching the connection members across the ends of the adjacent holder members.

The connection member is structured to comprise a pair of connection sections facing each other with a bent portion being interposed therebetween. On the other hand, insertion portions for receiving the connection members for permitting insertions of the connection sections are formed in portions adjacent to the ends of the holder members. Therefore, by inserting the connection sections into the insertion portions, the holder members can easily be connected to one another.

Another structure is simultaneously employed in which the extension holder member has a binding member having binding openings formed therein. A back-plate member having the insertion portions, which are formed symmetrically, of the connection sections are detachably attached to an end of the binding member. It is preferable that hooks for a hanger be detachably provided for the hook receiving portions in the region of the binding member and hanger hooks be detachably provided for the hook receiving portions.

Another aspect of the holder according to the present invention has a structure such that a plurality of accommodation pockets for recording media are formed on two surfaces of a single member. A binding member having binding openings in an end thereof is formed, and hook receiving portions, to which hooks for a hanger are detachable, are formed in a binding member region at positions inner than the binding openings.

BRIEF DESCRIPTION OF THE DRAWINGS

FIG. 8 (B) is an enlarged cross sectional view taken along line 8(B)—8(B) of FIG. 8 (A);

FIG. 9 (A) is a side view of a back-plate member;

FIG. 9 (B) is a view showing the back-plate member when viewed from the rear side thereof;

FIG. 10 (A) is a view showing the back-plate member when viewed from the inside thereof;

FIG. 10 (B) is an enlarged cross sectional view taken along line 10(B)—10(B) shown in FIG. 10 (A);

FIG. 10 (C) is an enlarged cross sectional view taken along line 10(C)—(10)C shown in FIG. 10 (A);

BEST MODE FOR CARRYING OUT THE INVENTION

An embodiment of the present invention will now be described with reference to the drawings.

Figure 1:
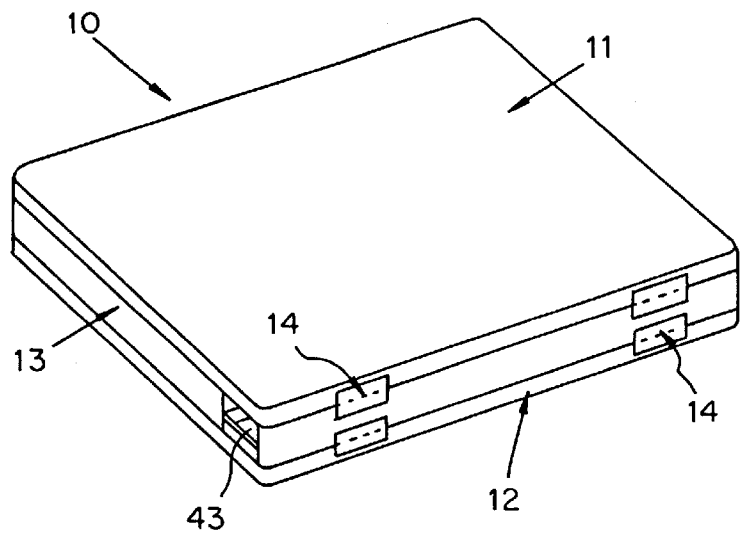
FIG. 1 is a schematic perspective view showing an embodiment of a holder according to the present invention.
Figure 2:
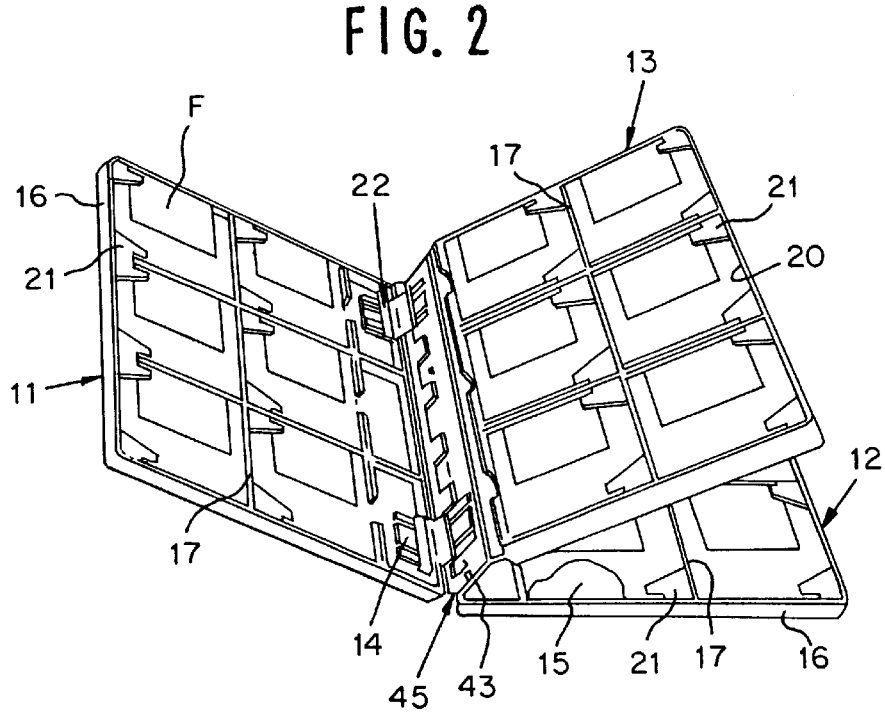
FIG. 2 is a schematic perspective view showing the holder in an open state.
Figure 3:
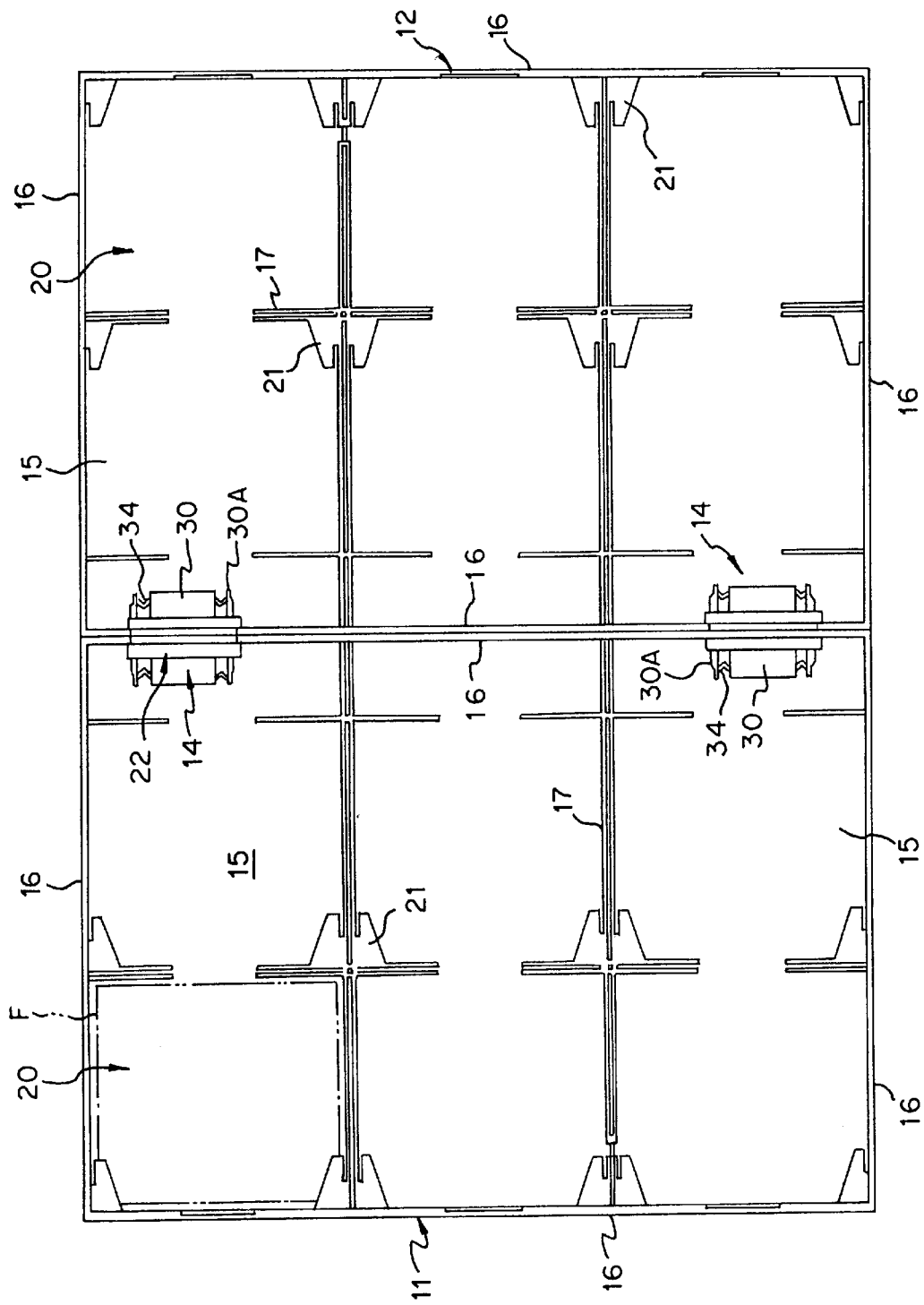
FIG. 3 is an inner plan view showing a state where a pair of inside and outside holder members are connected to each other and they are opened.

FIG. 1 is a schematic perspective view showing a holder according to this embodiment. FIG. 2 is a schematic perspective view showing holder members in a state where the holder members are opened. FIG. 3 is an inner plan view showing a state where an extension holder member is omitted and a pair of inside and back holder members are connected to each other. Referring to these drawings, a holder 10 comprises a pair of inside and outside holder members 11 and 12, an extension holder member 13 attached between the inside and outside holder members 11 and 12, and connection members 14 for mutually connecting the holder members 11 to 13 at their ends.

Each of the pair of inside and outside holder members 11 and 12, as best shown in FIG. 3, has plain portions 15, peripheral walls 16 formed on the outer end of each of the plain portions 15, and partition walls 17 for respectively dividing each plain portion 15 into six sections. As a result, accommodation pockets 20 are formed which are capable of accommodating floppy disks F serving as recording media. Separation of each floppy disk F accommodated in each of the accommodation pockets 20 is prevented by tag portions 21 formed at corners of the accommodation pocket 20 in such a manner that a gap corresponding to the thickness of the floppy disk F is maintained from the plain portion 15.

Figure 4:
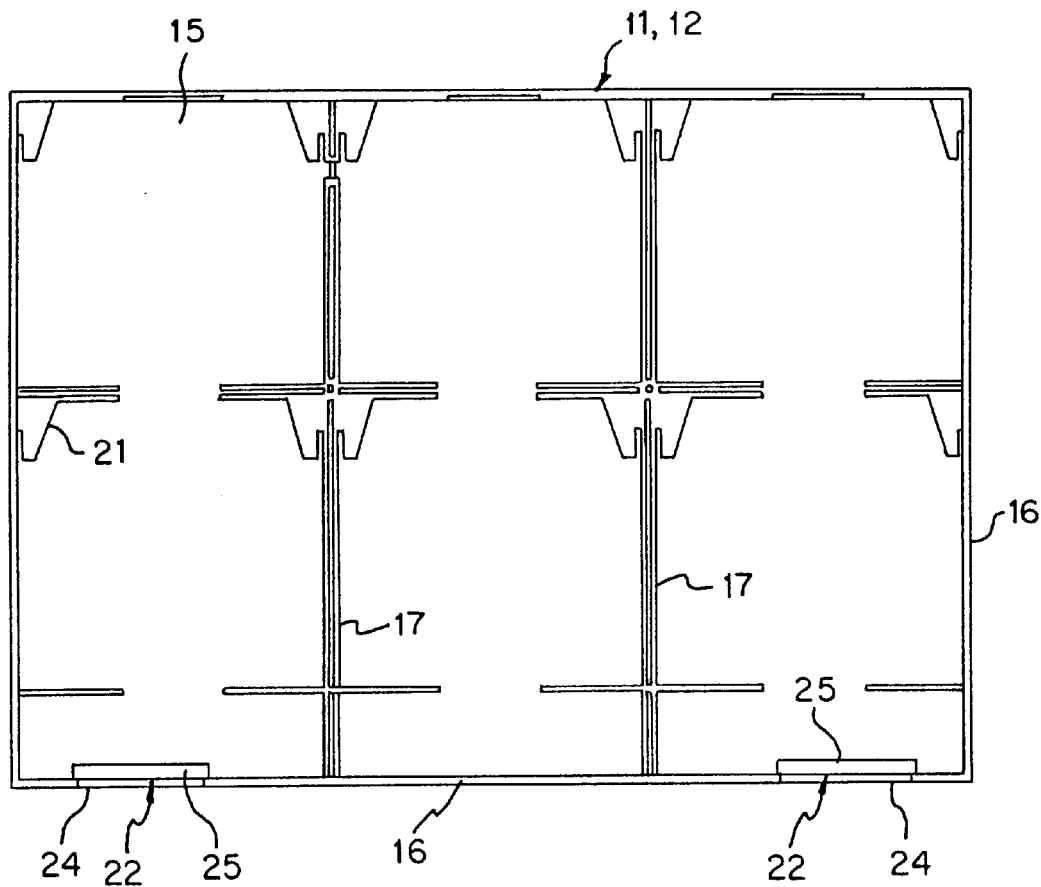
FIG. 4 is a plan view showing one of the inside and outside holder members which have been separated from another one.
Figure 5:
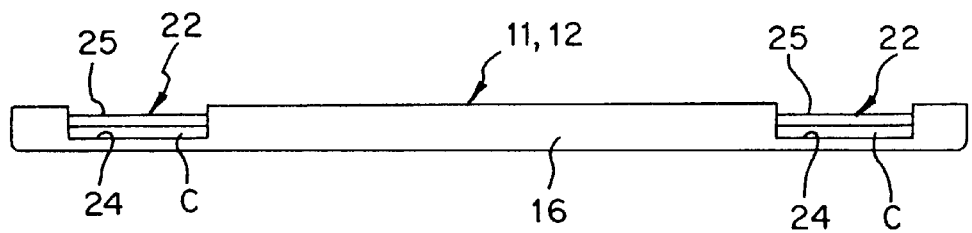
FIG. 5 is a side view showing a connection portion of the holder member shown in FIG. 4.

Also as shown in FIGS. 4 and 5, each of the holder members 11 and 12 has, in the connection portions thereof, insertion portions 22, to which connection members 14 (see e.g. FIG. 3) are detachably attached. The insertion portion 22 is composed of a cut-out portion 24 formed in the portion of the peripheral wall 16, which is the connection portion, and a frame portion 25 formed apart from the bottom of the cut-out portion 24 at a clearance C. The frame portion 25 is formed at a position on the inside of the peripheral wall 16 at a distance corresponding to the thickness of the peripheral wall 16.

Figure 6:
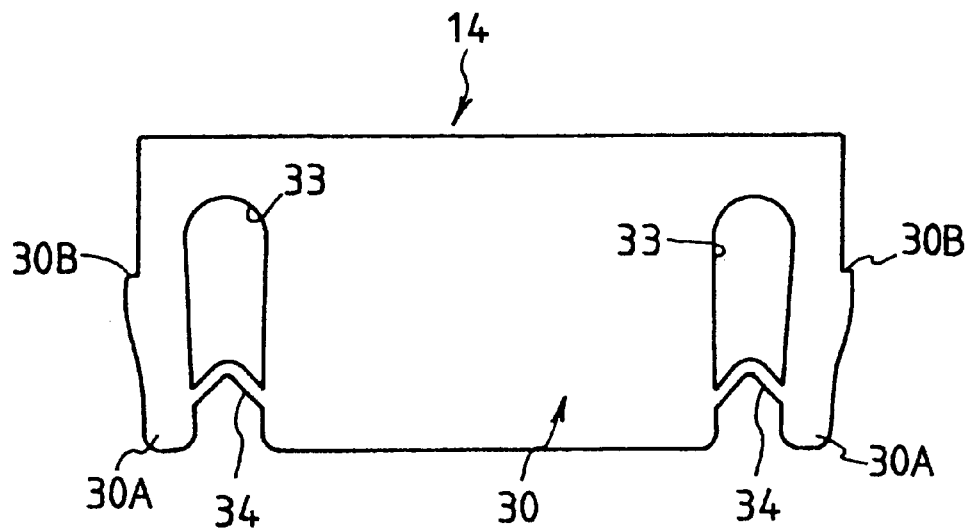
FIG. 6 is a side view of a connection member.
Figure 7:
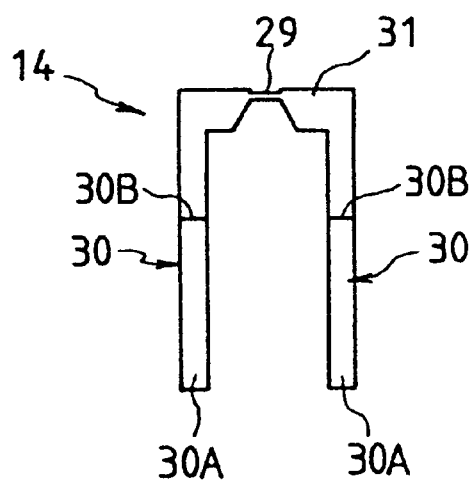
FIG. 7 is an end view of the connection member.

The connection members 14, as best shown in FIGS. 6 and 7, are disposed to face each other with a bent or hinge portion 29 being interposed therebetween, and has a pair of connection sections 30 each having a thickness with which insertion into the clearance C of the insertion portion 22 is permitted. The bent portion 29 is formed by partially thinning a joint member 31 positioned between connection sections 30. Each connection section 30 has, on the two end portions in the lengthwise direction thereof, cut-out recesses 33 each of which is formed into a U-like shape. Moreover, tags 30A are formed on the outsides of the cut-out recesses 33 through bent members 34 formed in the cut-out recesses 33. Stepped portions 30B are formed at outer ends of the tags 30A. The stepped portions 30B can be engaged to portions of the insertion portion, that is, the outer ends of the frame portion 25 when the connection section 30 has been inserted into the insertion portion 22. When inward forces act on the outside portions of the tags 30A by the user's fingers, the tags 30A are able to mutually deform toward the inside while being protected from being broken due to the existence of the bent member 34 so that the engagement with the frame portion 25 is suspended. If the forces of the fingers are suspended, returning to the original engagement portions is enabled.

The detailed structure of the extension holder member 13 will now be described. Components similar to those of the inside and outside holder members 11 and 12 are, hereinafter, given the same reference numerals and omitted from description or their descriptions are performed briefly.

Figure 8:
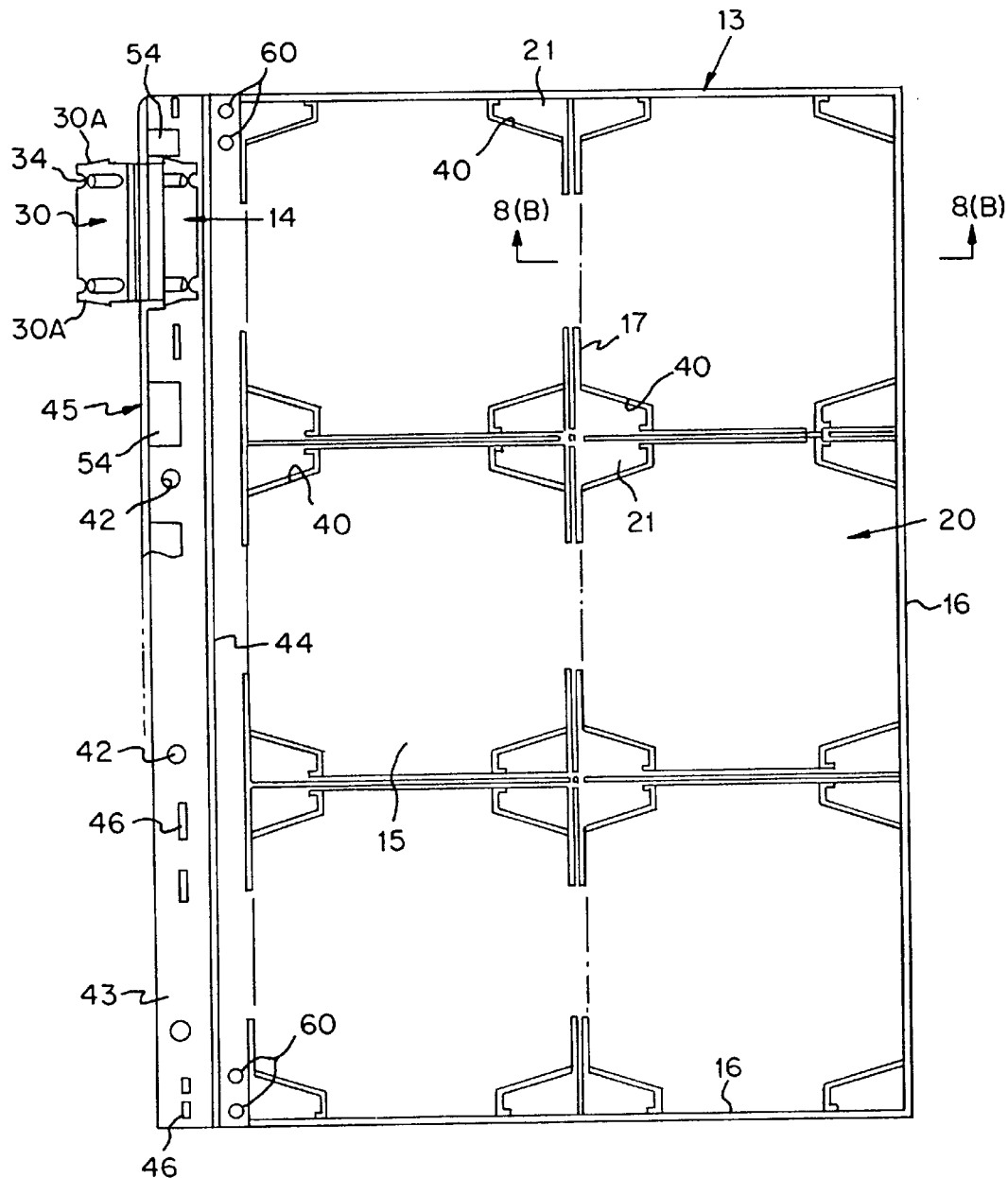
FIG. 8 (A) is a plan view showing an extension holder member.
Figure 8:
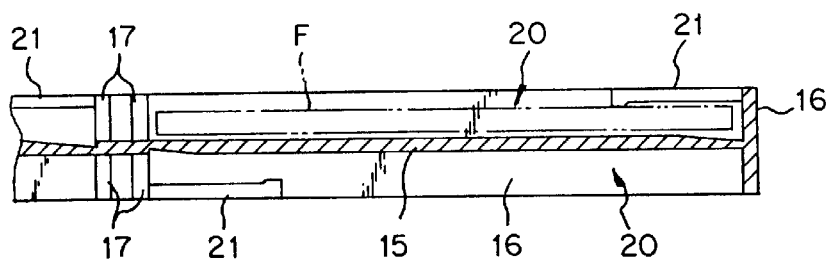

As shown in FIGS. 8 (A) and 8 (B), the extension holder member 13 has, on the two sides of the plain portions 15 thereof, pockets 20 for accommodating recording media. Separation of the floppy disk F accommodated in the accommodation pocket 20 is prevented by tag portions 21. Portions of the plain portion 15 opposite to the tag portions 21 are formed into punched holes 40.

As shown in FIG. 8 (A), the extension holder member 13 has a binding member 43 comprising a plurality of binding openings 42 formed along the end portion of the connection portion thereof. A back-plate member 45 can be detachably mounted on the end of the binding member 43. The binding member 43 has a bent portion 44 having partially thinned portions in the lengthwise direction thereof. When the extension holder member 13 is bound and connected between the pair of the holder members 11 and 12, the bent portion 44 prevents excess load from being applied to the portion in the vicinity of the connected portion to permit the free end to be moved in the direction of rotation. In the binding member 43, a plurality of rectangular openings 46 are formed on substantially the same line on which the binding openings 42 are formed, thus enabling the back-plate member 45 to be received in the rectangular openings 46.

As shown in FIGS. 9 and 10, the back-plate member 45 comprises a back-plate body 50 formed into an elongated shape, a pair of back-plate members 51 disposed at the two ends of the back-plate body 50 in the lengthwise direction and positioned apart from each other for a predetermined distance, insertion portions 53 each of which is formed between the back-plate body 50 and the back-plate members 51, and a plurality of holding members 54 (refer to FIG. 10 (A)) formed to project over either surface of the back-plate body 50 or the back-plate member 51 and positioned alternately to form a gap corresponding to the thickness of the binding member 43 of the extension holder member 13.

Each insertion portion 53 is composed of three narrow frame portions 55, 56 and 57 positioned symmetrically relative to the central frame portion 56. A clearance C formed among the frame portions 55 to 57 has a width which permits the connection section 30 of the connection member 14 to be inserted. The frame portions 55 and 57, except the central frame portion 56, are somewhat shifted toward the portion in which the holding members 54 are formed. The shifting distance substantially corresponds to the thickness of a connection section 41 of the connection member 14. Therefore, when the connection section 30 has been inserted into the insertion portion 22, the outer surface of the connection section 41 and the outer surface of the back-plate body 50 form the same plane. Among the holding members 54, a portion of the holding members 54 has a claw portion 54A. The claw portions 54A can be received by the rectangular openings 46 formed in the binding member 43. Thus, natural separation of the back-plate member 45 can be prevented.

Figure 11:
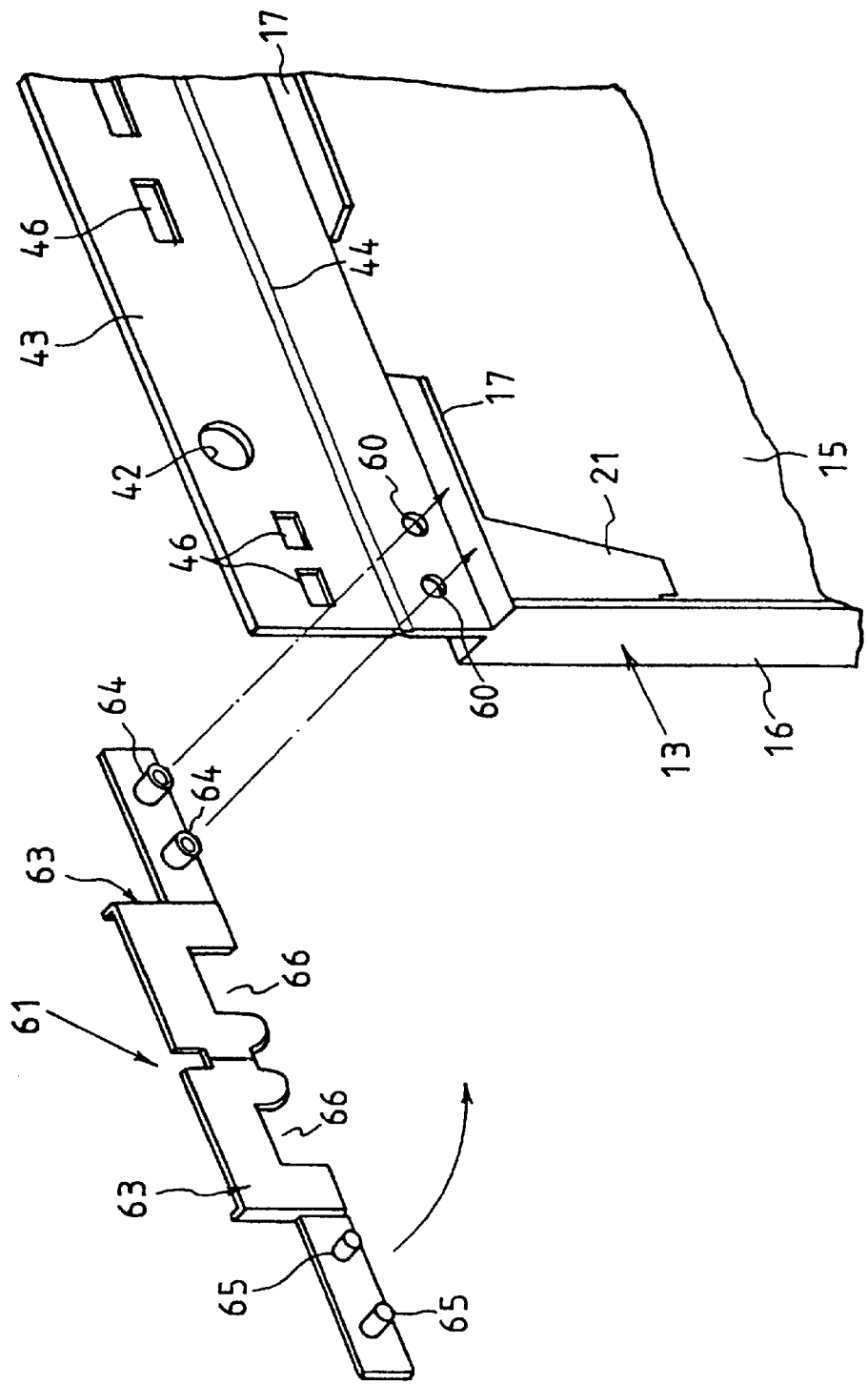
FIG. 11 is a schematic perspective view showing a state where hooks are attached to the extension holder member.

As shown in FIG. 11, near the two vertical ends (the right and left ends in the figure) of the binding member 43, a hook receiving portion 60 comprising two openings is formed. The hook receiving portion 60 may detachably receive a hook 61 which can be attached to a hanger rail (not shown). The hook 61 comprises a pair of right and left hook forming members 63 having a central portion which can be bent. Either hook forming member 63 has two cylindrical portions 64 shaped for insertion into the hook receiving portions 60. The other hook forming member 63 has pin shafts 65 which can be received in the cylindrical portions 64 in a bent state. Each hook forming member 63 has a recess 66 opened downwards. The recess 66 receives the hanger rail.

Methods of assembly use of the holder according to this embodiment will now be described with reference to FIG. 12.

The description will be performed about the case where the extension holder member 13 is bound between the pair of inside and outside holder members 11 and 12.

Initially, the back-plate member 45 is previously attached to the end of the binding member 43 of the extension holder member 13 (refer to FIG. 8 (A)). The attachment can be performed such that each holding member 54 of the back-plate member 45 is caused to face the end of the binding member 43, followed by inserting the binding member 43 into the spaces among the holding members 54 disposed alternately. Since the claws 54A of the holding members 54 are received in the rectangular openings 46 of the binding member 43 in the state where the attachment has been completed, the back-plate member 45 cannot be separated without external force being applied.

Figure 12:
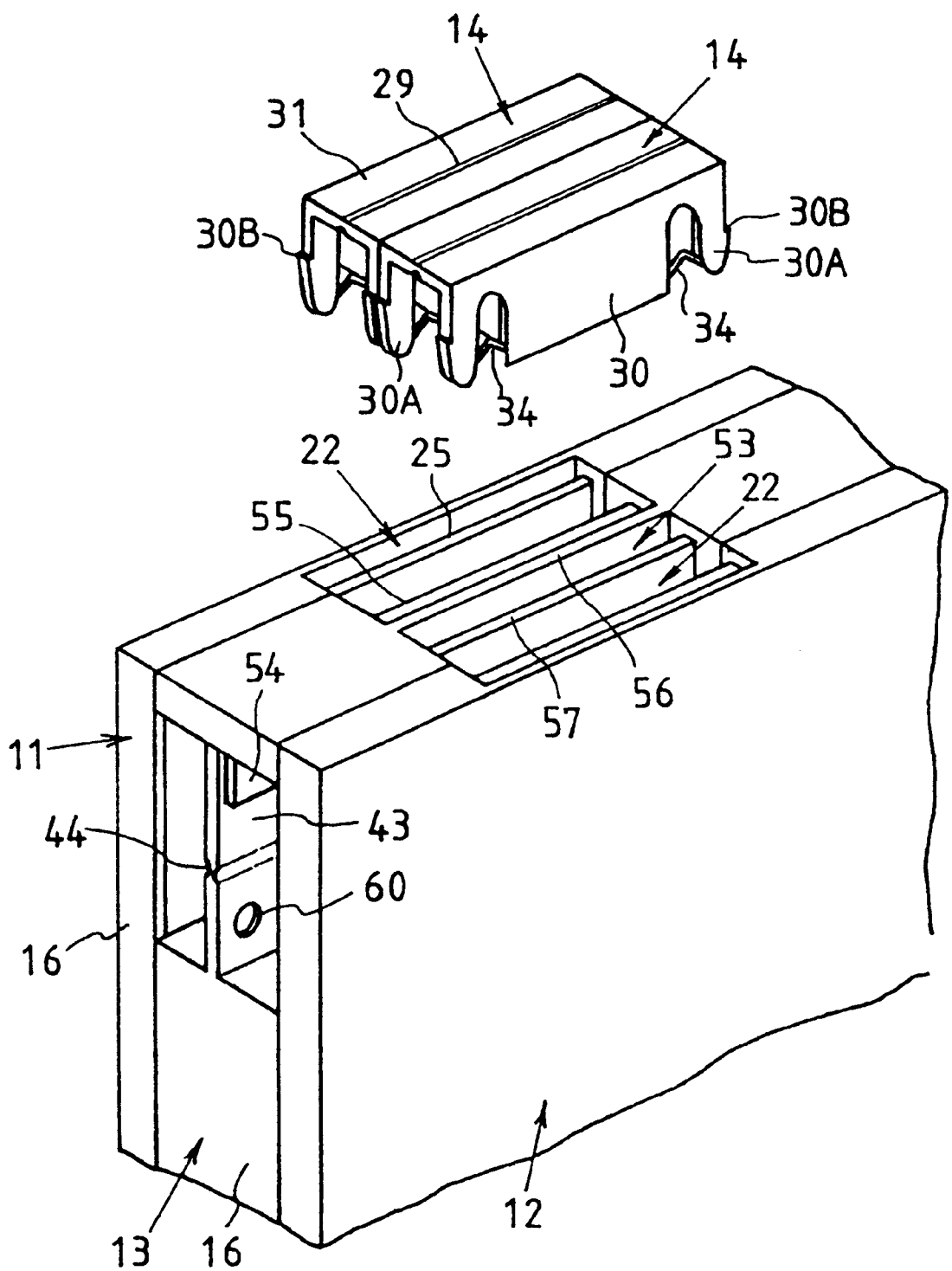
FIG. 12 is a schematic perspective view for explaining a method of attaching the connection member.

Then, as shown in FIG. 12, the holder members 11 to 13 are stood erect on a desk or the like while being stacked in such a manner that the positions of the insertion portions 22 and 53 coincide with each other and the insertion portions 22 and 53 are positioned upwardly. In the foregoing state, the connection sections 30 of the connection members 14 are somewhat inserted into the insertion portions 22 and 53 to be positioned across the ends of the holder members 11 to 13. When pushing force is applied from an upper portion, the claws 30A are displaced in a direction in which they approach each other so that insertions of the overall bodies of the connection sections 30 are permitted. Thus, the connection member 14 is inserted to the position at which the outer surface of the joint member 31 of the connection member 14 is positioned on the same plane as the end surfaces of the holder members 11 to 13. At this time, the stepped portions 30B formed at the outer ends of the claws 30A are engaged to the inside portions of the insertion portions 22 and 53 so that separation of the connection member 14 is prevented.

In the state after the foregoing connection operation has been completed, the holder members 11 to 13 are integrated as shown in FIG. 1 so that a holder for accommodating the floppy disks F is used.

In a case where a novel extension holder member 13 is further added between the holder 11 and the extension holder member 13, development, for example, as shown in FIG. 2, is performed. Then, the claws 30A of the connection members 14 of either of the holder 11 or the extension holder member 13 are gripped with fingers from outer portions. When forces are, in the foregoing state, applied in directions in which the claws 30A approach each other, the foregoing engagement is suspended. At this time, pulling of the holder members 11 and 13 in directions in which they are moved apart from each other enables the connection to be suspended. Then, other connection members 14, corresponding to the extension holder member 13 intended to be added, are required to be used in such a manner that the connection members 14 are placed across the end portions, that is, the connection sections 30 of the connection members 14 respectively are inserted into the insertion portions 22 and 53.

The extension holder member 13 may be used in a selected hanging file method as shown in FIG. 11. In this case, the back-plate member 45 is required to be previously removed from the binding member 43, followed by attaching the hook 61 so as to be received in the hook receiving portion 60. The receipt can be performed by previously inserting the cylindrical portions 64 of the hook forming members 63 into the hook receiving portions 60 and by bending the hook forming member 63 having the pin shafts 65 in a direction indicated by an arrow shown in FIG. 11 so as to cause the pin shafts 65 to be received in the cylindrical portions 64. In a state where the back-plate member 45 and the hook 61 are not attached, the holder member 13 can be filed in a usual binder or the like by using the binding openings 42 of the binding members 43.

Although the embodiment has been described with reference to the drawings about the holder members 11 and 12 positioned on the two sides of the holder 10 and having the flat outer surfaces the present invention is not limited to this arrangement. That is, the present invention includes, in the scope thereof, a structure in which the holder members 11 and 12 are provided with accommodation pockets 20 on the two sides thereof and thus they are formed into substantially the same structure as the extension holder member 13.

Although the structure is adopted in which the connection members 14 respectively are attached to the two portions along the vertical direction of the holder members 11 to 13, forming of the lengthwise directional length of the connection member 14 to be longer than that according to this embodiment enables mutual connections to be performed at one end portion of the holder members 11 to 13. Moreover, the shape of the connection member 14 is not limited to the shape according to the illustrated embodiment. Thus, a variety of shapes may be adopted if substantially the same results can be attained.

The shapes of the hook receiving portions 60 formed in the binding member 43 of the extension holder member 13 are determined depending upon the relationship with the shapes of the hooks 61 to be attached. Therefore, the shapes are not limited to the round openings as illustrated. For example, the hook receiving portions 60 may be formed into pins projecting over the two surfaces of the binding member 43 in place of the round openings. In the case, openings to be press-fit into the pins can be considered to be formed in the hook 61.

Although the holder members 11 to 13 adopt the accommodation pockets 20 suitable to accommodate the floppy disks F, the holder according to the present invention can, of course, accommodate other recording media. In a case where, for example, compact disks (CDs) are intended to be accommodated, it is sufficient to form the shape of the accommodation pocket into a circular shape and to provide an appropriate holding portion for the central portion or the outer portion to hold the disks. In addition, the present invention is not limited to the plural accommodation pockets 20 formed on each surface of the holders 11 to 13. A structure having one accommodation pocket 20 may be adopted. Since a recording medium, such as a laser disk, has a large diameter, the number of the accommodation pocket 20 is inevitably made to be one.

Since the present invention has the foregoing structure and functions as described above, the following effects can be obtained.

That is, since the structure is arranged in such a manner that the connection members capable of arbitrarily connecting and separating the holder members are adopted and the connection members can be inserted into the insertion portions of each of the holder members, a single holder can be constituted in a state where a multiplicity of holder member are connected to one another. Thus, recording media can concentrically be stored and controlled.

Since the connection member comprises a pair of connection sections facing each other while the bent portion being interposed has a characteristic with which it can be mass-produced by using a resin material, a necessity of using a costly binder or the like can be eliminated thanks to the connection members which can be provided with a low cost. Moreover, since the present invention is intended to progressively consider the extension-type holder, a consumer is simply required to purchase only the extension holder which can be provided as a single body. Therefore, a user is able to obtain an economical advantage.

In addition, since the extension holder can be used in such a manner that the holder members are separated from one another to select a method of usage from a variety of methods, adaptation to a variety of needs of customers can be performed and, therefore, the value as the commodity can further be improved.

INDUSTRIAL APPLICABILITY

The present invention can be used as a holder suitable to collectively accommodate and control recording media, such as floppy disks.

What is claimed is:

1. A holder, comprising a pair of holder members each having at least one accommodation pocket for receiving recording media, and a pair of discrete connection members, wherein said pair of holder members are mutually separably connected to each other through said connection members which are detachably attached to adjacent ends of said holder members;

further comprising at least one extension holder member mounted between said pair of holder members, and means for detachable mounting of said at least one extension holder member to said holder members;

wherein said detachable mounting means includes said pair of discrete connection members located along regions of an edge of said at least one extension holder member and said discrete connection members being discretely spaced from each other and inwardly spaced from opposite ends of said edge.

2. A holder according to claim 1, wherein each connection member includes a pair of connection sections facing each other and a bent portion being disposed between said connection sections, and insertion portions for said connection sections are formed in portions adjacent to said ends of said holder members, said connection sections being insertable into said insertion portions so that said holder members are connected to one another.

3. A holder, comprising a pair of holder members each having at least one accommodation pocket for respectively receiving recording media and at least one connection member, wherein said pair of holder members are mutually separably connected to each other through said at least one connection member which is detachably attached to ends of said holder members;

wherein said at least one connection member includes a pair of connection sections facing each other and a bent portion being disposed between said connection sections, and insertion portions for said connection sections are formed in portions adjacent to said ends of said holder members, said connection sections being insertable into said insertion portions so that said holder members are connected to one another;

further comprising an extension holder member mounted between said holder members, said extension holder member including a binding member having binding openings formed therein, and a back-plate member having said insertion portions is detachably attached to an end of said binding member.

4. A holder according to claim 3, wherein said extension holder member has a pair of hook receiving portions in a region of said binding member, and hooks for a hanger are detachably provided for said hook receiving portions.

5. A holder comprising a holder member including at least one accommodation pocket for storage of recording media formed on each of two surfaces of the holder member, a binding member having binding openings and hook receiving portions in an end thereof, and further comprising at least one hook for a hanger, said at least one hook being reattachably mountable to said binding member.

6. The holder of claim 3, wherein said insertion portions are symmetrically formed along said back-plate member.

* * * * *